United States Patent [19]

Morishita

[11] Patent Number: 4,536,669
[45] Date of Patent: Aug. 20, 1985

[54] DIRECT CURRENT MOTOR
[75] Inventor: Akira Morishita, Himeji, Japan
[73] Assignee: Mitsubishi Denki Kabushiki Kaisha, Tokyo, Japan
[21] Appl. No.: 620,175
[22] Filed: Jun. 13, 1984
[30] Foreign Application Priority Data Jul. 20, 1983 [JP] Japan ................ 58-133917

[51] Int. Cl.³ ............................. H02K 13/00
[52] U.S. Cl. .................... 310/241; 310/230; 310/307
[58] Field of Search .......... 310/68 R, 68 C, 240, 310/241, 307, 229, 230

[56] References Cited

U.S. PATENT DOCUMENTS

| | | |
|---|---|---|
| 1,796,193 | 3/1931 | Eaton . |
| 1,927,176 | 9/1933 | Langley ............... 310/241 |
| 2,753,477 | 7/1956 | Yahn . |
| 3,480,813 | 11/1969 | Sillano . |
| 4,010,455 | 3/1977 | Stange ............... 310/307 X |

FOREIGN PATENT DOCUMENTS 1237988  7/1971  United Kingdom .
1491700  11/1977  United Kingdom .

Primary Examiner—Donovan F. Duggan
Attorney, Agent, or Firm—Oblon, Fisher, Spivak, McClelland & Maier

[57] ABSTRACT

A d.c. motor comprises a cylindrical yoke, at least one set of field magnets of permanent magnets fixed to the inner peripheral surface of the yoke, an armature wound with armature windings so as to be surrounded by the field magnets, a commutator firmly mounted on a rotary shaft of the armature, a set of brushes being in slide-contact with the commutator, and a displacing means for shifting the position at which the brushes are made in slide-contact with the commutator in the counter direction of the rotation of the armature depending on rise in temperature of the d.c. motor.

5 Claims, 8 Drawing Figures

DIRECT CURRENT MOTOR

The present invention relates to a direct current motor. More particularly, it relates to a d.c. motor with use of permanent magnets to produce a magnetic field.

For a direct current motor (hereinafter referred to as a d.c. motor), a rotational force is obtained by switching an armature current through a commutator attached to the rotary shaft.

A conventional d.c. motor of this kind is constructed as shown in FIGS. 1 and 2, in which a rotor 3 comprises an armature 1 and armature windings 2 wound on the armature 1. A commutator 4 is firmly mounted on the rotary shaft inserted in the armature 1. The rotary shaft is supported at both ends end brackets 6, 61, through bearings 7, 71, which support a two-pole-type stator 5. The stator 5 comprises a cylindrical yoke 9 having the inner surface to which permanent magnets with polarities opposite each other are attached and auxiliary magnetic poles 10, 101 made of a magnetic substance having magnetic permeability greater than the reversible magnetic permeability of the permanent magnets 8, 81 to constitute haft of the magnetic poles.

Operations of the d.c. motor having the construction as above-mentioned will be described with reference to FIGS. 3a and 3c. In FIG. 3a, the lines A and B respectively show the distributions of magnetic flux in an air gap produced only by the permanent magnets 8, 81 and the line C shows the distribution of magnetomotive force caused by armature reaction. FIG. 3b shows a composed characteristic of the lines A, B, C shown in FIG. 3a in which the line D shows magnetic flux in air gap formed by each of the permanent magnets 8, 81, the line E shows the characteristic of magnetic flux in air gap formed by each of the auxiliary magnetic poles 10, 101. The magnetic flux-temperature characteristic of the permanent magnets 8, 81 has relationship as shown in FIG. 4.

In the conventional d.c. motor as above-mentioned, magnetic flux density decreases with rise in temperature of the permanent magnets 10, 101 on account of which each of the magnetic flux in air gap A, B decreases. Accordingly, the magnetic neutral point of the motor is shifted in the counter direction of the rotation of the armature 1 thereby to cause reduction in torque characteristic of the motor.

Detailed description will be made as to the shift of the magnetic neutral point with reference to FIG. 5 showing a case using a motor having four magnetic poles without any auxiliary magnetic poles (strontiumanisotropic ferrite is used for the permanent magnets). However, principle as shown in FIG. 5 is applicable to a case having the auxiliary magnetic poles or a case having different number of magnetic poles as well.

As shown in FIG. 5, the magnitude of the armature reaction does not change depending on temperature, while the magnetic flux of the magnets changes depending on temperature. Namely, the magnetic flux of the magnet at a temperature of $-20°$ C. is designated by the solid line $H_1$ and magnetic flux distribution composed with the armature reaction is designated by the solid line AE. Then, when temperature rises at $+100°$ C., the magnetic flux of the magnets reduces as shown by one-dotted chain line $H_2$ and the magnetic flux distribution composed with the armature reaction becomes a state shown by one-dotted chain line BJ. Accordingly, the magnetic neutral point (a position of the line CD which renders the surface area of a trapezoid defined by four points ABCD to be equal to a trapezoid defined by four points CDEF in FIG. 5) changes from C to G.

It is an object of the present invention to prevent reduction in torque characteristic of a d.c. motor which is caused by shift of a magnetic neutral point due to increase in temperature of permanent magnets.

The foregoing and the other objects of the present invention have been attained by providing a d.c. motor comprising a cylindrical yoke, at least one set of field magnets consisting of permanent magnets fixed to the inner peripheral surface of the yoke, an armature wound with armature windings so as to be surrounded by the field magnets, a commutator firmly mounted on a rotary shaft of the armature, a set of brushes being in slide-contact with the commutator, and a displacing means for shifting the position at which the brushes are made in slide-contact with the commutator in the counter direction of the rotation of the armature depending on temperature rise of the d.c. motor.

A more complete appreciation of the invention and many of the attendant advantages thereof will be readily obtained as the same becomes better understood by reference to the following detailed description when considered in connection with the accompanying drawings, wherein.

A preferred embodiment of the present invention will be described with reference to drawing.

Figure 6:
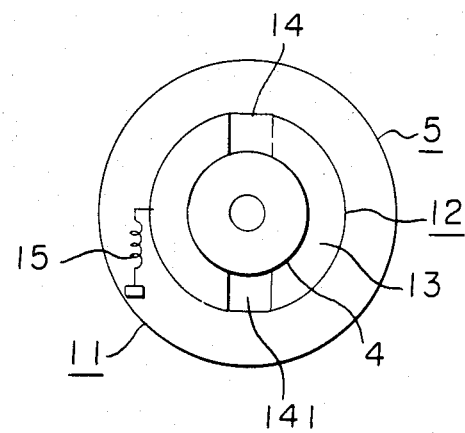
FIG. 6 is a diagram showing a construction of the d.c. motor accordingly to the present invention.

FIG. 6 showing the outline of the present invention, the reference numeral 11 designates a magnet driving type motor, the numeral 12 refers to a brush holder unit comprising a brush holder (not shown) turnably supported by a base plate 13 and brushes 14, 141 held by the brush holder to be in slide-contact with a commutator 4 and the numeral 15 indicates a brush holder displacing means made of so-called a shape memorizing alloy which functions to shift the brush holder in the counter direction of the rotation of the armature of the motor. The quantity of the shift of the brush holder depends on whether the d.c. motor is at a low or high temperature.

Figure 1:
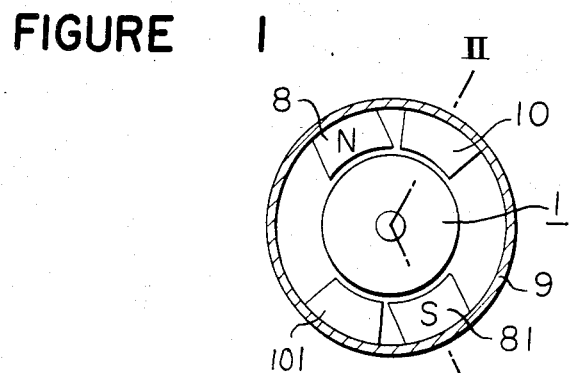
FIG. 1 is a cross-sectional view showing a typical conventional d.c. motor.
Figure 2:
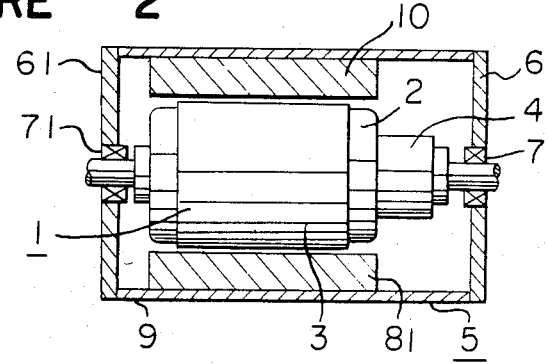
FIG. 2 is a cross-sectional view taken along the line II—II in FIG. 1.
Figure 3:
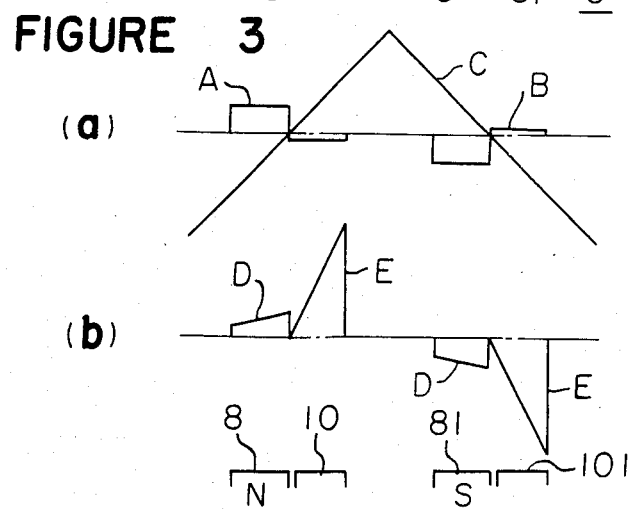
FIG. 3 is a diagram showing characteristic of the conventional d.c. motor.
Figure 4:
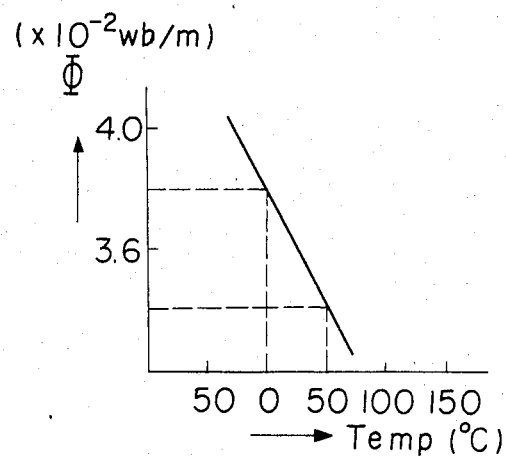
FIG. 4 is a diagram showing temperature-magnetic flux characteristic of permanent magnets.
Figure 5:
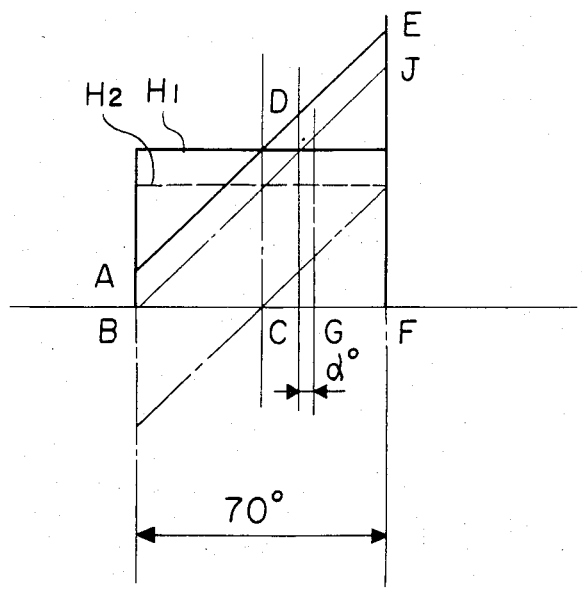
FIG. 5 is a diagram showing shift of a magnetic neutral point.
Figure 7:
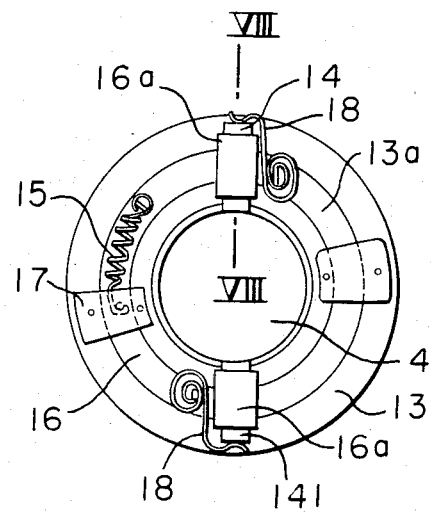
FIG. 7 is a front view of an embodiment of the d.c. motor of the present invention.
Figure 8:
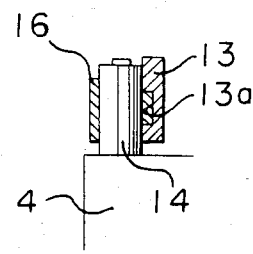
FIG. 8 is a cross-sectional view taken along the line VIII—VIII in FIG. 7.

The construction of the device according to the present invention will be described in more detail with reference to FIG. 7 as well as FIG. 8 which is a sectional view taken along the line VIII—VIII in FIG. 7. The same reference numerals as in FIGS. 1, 2 and 6 designate the same parts. Around the commutator 4, there is fixedly placed a ring-shaped base plate 13 provided with at its one surface a ring-shaped groove 13a with which a brush holder 16 is turnably engaged. A pair of brush holder boxes 16a is formed integrally with the brush holder 16 at diametrically opposing opposition. A pair of cover members 17 is attached to the base plate 13 between the brush holder boxes 16a and the intermediate portion of each of the cover member 17 is bridged over the brush holder 16 to prevent the brush holder 16 from coming out from the groove 13a. The brush holder displacing means 15 is constituted by so-called a shape memorizing alloy and has one end secured to the brush holder 16 and the other end connected to the cover member 17, i.e. to the frame side of the d.c. motor in an immovable manner. In the vicinity of the brush holder boxes 16a each of springs 18 is placed on the brush holder 16 to push the top of each of the brushes 14, 141 towards the commutator 4.

In the d.c. motor having the construction as above-mentioned, when temperature of the motor rises, deformation such as elongation and shrinkage of the brush holder displacing means 15 takes place to cause turning movement of the brush holder 16 by a predetermined distance whereby the position of the brushes 14, 141 is changed so as to compensate deflection of the magnetic neutral point. Thus, even though the magnetic neutral point of the d.c. motor is deflected due to rise in temperature, the position of the brushes 14, 141 is changed to compensate the deflection to thereby prevent reduction in torque caused by temperature rise of the motor. It is especially effective to apply the torque characteristic obtained by the present invention to a motor to which a large torque is required, for example a starting motor for engine.

The shape memorizing alloy may be nickel-titanium alloy (for example, copper-zinc-aluminum, copper-aluminum-beryllium and so on) either of which is applicable by suitable selection of the characteristics of the alloys.

In the embodiment, description has been made as to use of the shape memorizing alloy as a temperature detecting and driving means. It should, however, be understood that the same effect can be obtained even when a temperature detection device such as a bimetal, a bellows and so on having a driving function is connected to the brush holder.

I claim:

1. A d.c. motor which comprises:
a cylindrical yoke;
at least one set of field magnets consisting of permanent magnets fixed to the inner peripheral surface of said yoke, said permanent magnets having a magnetic flux which varies with temperature, the magnetic neutral point of said field magnets being deflected when said magnetic flux varies;
an armature wound with armature windings so as to be surrounded by said field magnets;
a commutator firmly mounted on a rotary shaft of said armature;
a set of brushes being in slide-contact with said commutator;
said brushes being mounted on a brush holder which is in sliding relation with said yoke; and
a displacing means for shifting the position at which said brushes are made in slide-contact with said commutator by slidingly rotating said brush holder in the counter direction of the rotation of said armature so as to compensate for said deflection of said magnetic neutral point;
said displacing means being actuated by a rise in temperature of said d.c. motor.

2. The d.c. motor according to claim 1, wherein said displacing means is a spring means consisting of a shape memorizing alloy.

3. The d.c. motor according to claim 2, wherein said spring means is in a form of a coil spring.

4. A d.c. motor according to claim 1 wherein one end of said displacing means is connected to said brush holder and the other end of said displacing means is fixedly connected.

5. A d.c. motor according to claim 4 wherein a cover member is fixedly attached to said yoke and extends over said brush holder and wherein said other end of said displacing means is connected to said cover member.

* * * * *